United States Patent [19] [11] 4,091,398
Iida et al. [45] May 23, 1978

[54] ELECTRONIC PHOTOFLASH UNIT HAVING REMOTE CONTROL DEVICE TRANSMITTER FUNCTION

[75] Inventors: Yozo Iida, Komae; Yasuhito Kawahara; Shigemi Igarashi, both of Tokyo, all of Japan

[73] Assignees: Nippon Kogaku K.K.; Sato Koki K.K., both of Tokyo, Japan

[21] Appl. No.: 652,156

[22] Filed: Jan. 26, 1976

[30] Foreign Application Priority Data

Jan. 31, 1975 Japan .............................. 50-13479[U]

[51] Int. Cl.[2] ...................... G03B 15/03; H05B 41/14; G03B 7/16

[52] U.S. Cl. ................................ 354/145; 315/241 P; 354/33

[58] Field of Search ....................... 354/32, 33, 34, 35, 354/60 F, 145; 315/241 P, 241 R

[56] References Cited

U.S. PATENT DOCUMENTS

| | | | |
|---|---|---|---|
| Re. 28,783 | 4/1976 | Ackermann | 315/241 P X |
| 3,424,071 | 1/1969 | Schwann | 354/145 |
| 3,710,701 | 7/1977 | Takishima et al. | 354/145 X |
| 3,809,954 | 5/1974 | Engelslatter | 315/241 P |
| 3,878,433 | 4/1976 | Sato | 315/241 P |
| 3,921,184 | 11/1975 | Borowski et al. | 354/149 X |

*Primary Examiner*—L. T. Hix
*Assistant Examiner*—William B. Perkey
*Attorney, Agent, or Firm*—Fitzpatrick, Cella, Harper & Scinto

[57] ABSTRACT

Electronic photoflash unit has functions as a remote control device transmitter and as photoflash for flash photography. The photoflash unit decreases the amount of radiated light when used as the remote control device transmitter and increases the light when used as the photoflash for making photographs.

1 Claim, 4 Drawing Figures

ELECTRONIC PHOTOFLASH UNIT HAVING REMOTE CONTROL DEVICE TRANSMITTER FUNCTION

BACKGROUND OF THE INVENTION

1. Field of the Invention

This invention relates to an electronic photoflash unit and more particulary to its function as a remote control device transmitter.

SUMMARY OF THE INVENTION

An object of the present invention is to provide a novel electronic photoflash unit which decreases the amount of radiated light when used as a remote control device transmitter and increases the light when used as a photoflash for making photographs.

A further object of the present invention is to provide automatic changeover of its two functions, carried out by connection and disconnection of the photoflash unit and the synchronization terminal of a camera.

DESCRIPTION OF THE PREFERRED EMBODIMENTS

Figure 1:
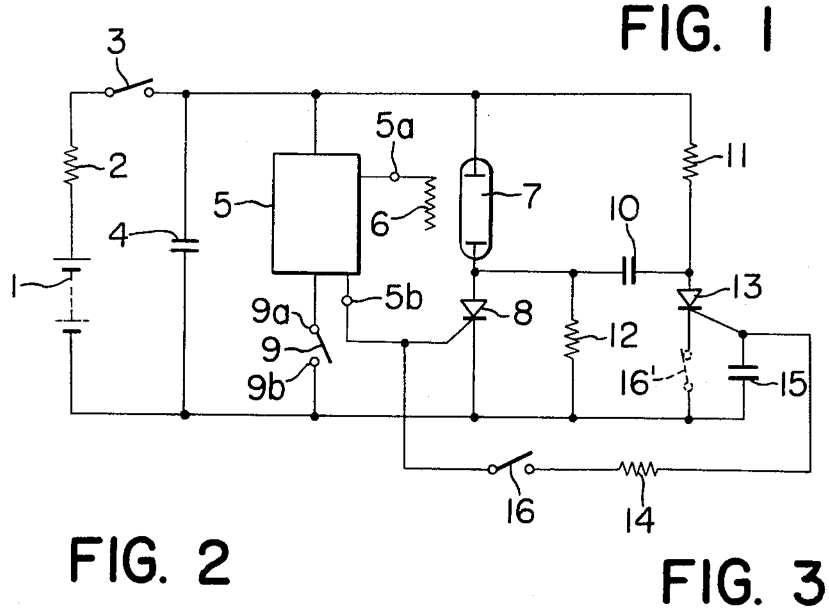
FIG. 1 is a circuit diagram of the electronic photoflash device of the first embodiment.

In FIG. 1 the power source 1 charges a main capacitor 4 through a guard resistor 2 and power switch 3. The trigger circuit 5 is provided with an output terminal 5*a* connected to a trigger electrode 6, and an output terminal 5*b* connected to the gate of SCR 8 which is serially connected to a flash discharge tube 7.

When a trigger switch 9 is closed, the trigger circuit 5 develops a high-voltage pulse at the electrode 6 and, at the same time, energizes SCR 8 and causes discharge by the main capacitor 4 through the flash discharge tube 7. Capacitor 10 is charged through resistors 11 and 12 and, when SCR 13 is energized, discharges current in the reverse direction to deenergize SCR 8.

Resistor 14 and capacitor 15, composing a delay circuit, are connected between the output terminal 5*b* and the negative pole of the power source 1 through an interlocking switch 16, and the junction of the resistor 14 and capacitor 15 is connected to SCR 13.

The interlocking switch 16 is opened by mounting the photoflash unit onto a camera. Conversely, it is closed when the photoflash unit is dismounted for use as a remote control device transmitter.

Next, the actual interlocking relationships of the interlocking switch 16 are described.

Figure 2:
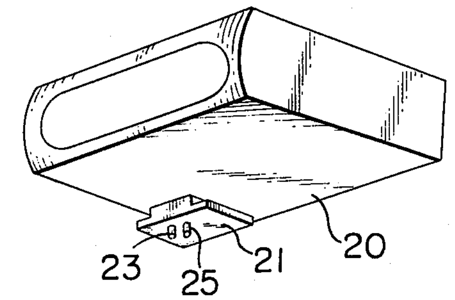
FIG. 2 is a diagrammatic view illustrating the appearance of the photoflash unit according to the first embodiment.

In FIG. 2 a body 20 of the photoflash unit is provided with a conductive accessory shoe 21 for fitting into a conductive accessory clip on a camera body.

Figure 3:
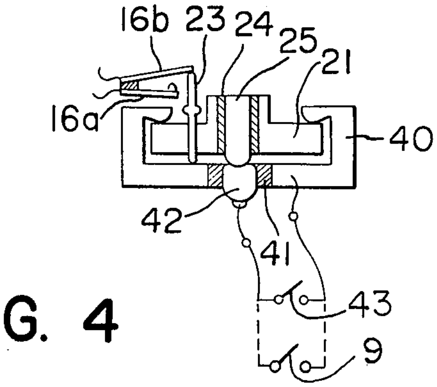
FIG. 3 is a sectional view illustrating the connection of the accessory shoe and the accessory clip of the first embodiment.

In FIG. 3 the shoe 21 is fitted into the conductive accessory clip 40 on a camera and the photoflash unit 20 is mounted thereon.

The shoe 21 is provided with an insulator pin 23, spring loaded downwards, (not shown in the figure) and is slidable in vertical directions in the figure; and a conductor 25 insulated from the shoe by an insulator 24 and connected to a junction 9*b* of the switch 9. Two switch tongues 16*a* and 16*b* which constitute the interlocking switch 16 are separated by the slidable pin 23 when the shoe is fitted into the clip as shown in the figure.

A conductor 42 is provided on the clip 40, insulated from the clip by an insulator 41, and the clip 40 and the conductor 42 are connected through the synchronization switch 43 which closes in accordance with the action of the camera shutter. Accordingly, when the shoe 21 is fitted into the clip 40, conductor 25 is connected with conductor 42 and the shoe 21 with the clip 40 so that the synchronization switch 43 is connected in parallel with the trigger switch 9 and, the interlocking switch 16 is opened. When the synchronization switch 43 is closed, the flash discharge tube 7 is excited by a high-voltage pulse developed at the trigger terminal and SCR 8 is energized, so that the main capacitor 4 discharges to cause the flash discharge tube to flash and a flash photograph is made. Capacitors 10 and 15 and SCR 13 remain inactive during this time because the interlocking switch 16 is opened.

On the other hand, when the shoe 21 is disconnected from the clip 40 and the photoflash unit is dismounted from the camera for using it as a remote control device transmitter, the slidable pin 23 is forced down by its spring to close the interlocking switch 16.

When the trigger switch 9 is closed, the flash discharge tube 7 radiates a light flash as previously described. However, when the trigger switch 9 is closed, the capacitor 15 is charged by the trigger circuit 5 through the resistor 14, and when the capacitor 15 is charged to specified voltage it energizes SCR 13. Therefore, since the capacitor 10 discharges and deenergizes SCR 8, radiation of the light flash from the discharge tube is stopped halfway. In other words, as the amount of light flashed is governable by the time constant of the CR circuit 14 and 15, the time constant is appropriately regulated so that the amount of light flashed and signaled by the photoflash unit is sensible by the receiver of a remotely controlled device. For example, the light flash signal can be received by a receiver to control a movie camera, a motor-driven camera, etc.

The interlocking switch 16 can be removed from the delay circuit 14 and 15 and replaced with an interlocking switch 16′, which is similar to interlocking switch 16, in the discharge circuit of capacitor 10.

Figure 4:
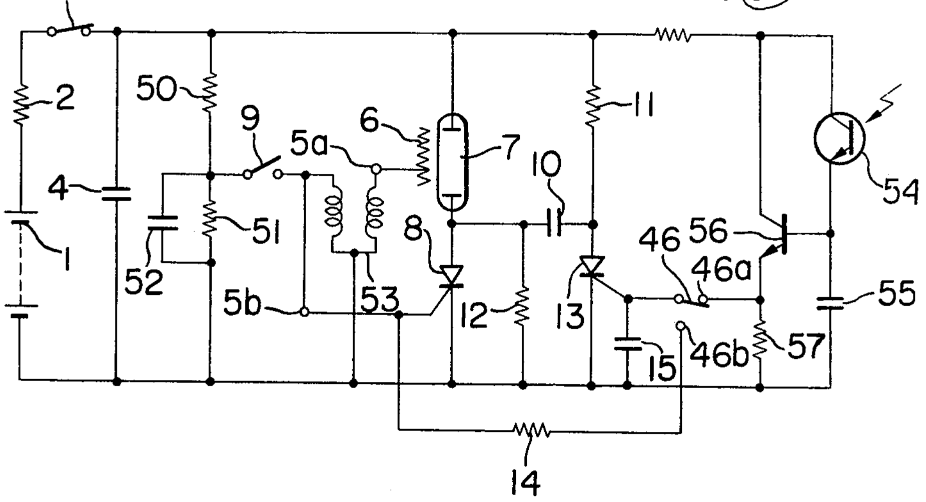
FIG. 4 is a circuit diagram of the automatic light adjusting system for use in flash photography of the second embodiment.

In FIG. 4 resistors 50 and 51, capacitor 52, and transformer 53 constitute a trigger circuit.

A photoelectric element 54 and capacitor 55 constitute a light measuring circuit for the reflected light flash received from an object, and produces an output, corresponding to the amount of light received, to the base of switching transistor 56 to energize it when the reflected light reaches the appropriate amount sufficient for exposure.

An interlocking switch tongue 46 connected to the gate of SCR 13 interlocks with the pin 23 in FIG. 3, and the tongue in connected to a contact 46*a* connected to the junction of the transistor 56 and resistor 57 when the photoflash unit is mounted on the camera, i.e., the shoe 21 is fitted into clip 40. Conversely, it is connected to a contact 46*b* connected to resistor 14 when not mounted, i.e., the apparatus is used as a remote control device transmitter.

The construction is the same as for the first embodiment.

When the photoflash unit is used as a transmitter by disconnecting the shoe 21 and clip 40, the switch tongue 46 is connected to contact **46*b* and a light flash signal is generated during the time regulated by the time constant of the delay circuit 14 and 15**.

Conversely, when the photoflash unit is used for flash photography, since the switch tongue 46 is connected as shown in the FIG. 4 to the contact **46*a* by fixing the shoe 21 into the clip 40, when the camera synchronization switch connected to the trigger switch 9 in parallel is closed, a light flash is emitted as previously described. The photoelectric element 54 receives the reflected light flash, begins charging capacitor 55, and when the amount of reflected light is sufficient for proper exposure, the transistor 56 and SCR 13 are energized. Therefore, discharge by the capacitor 10 deenergized SCR 8** and flash discharge is stopped. Thus, a photograph by automatic flash is made.

In this embodiment, the circuit construction is simplified because the switching circuit 8, 10 and 13 for stopping the flash discharge may be used for both functions: transmitted and photoflash.

In the described embodiments, opening and closing of interlocking switches 16, 16' and 46 and the parallel connection of the synchronization switch to the trigger switch are carried out by fitting the shoe into the clip, however, synchronization switch may be connected separately by use of a synchronization cord.

In the switching circuit of the above embodiments, radiation of light flash is stopped by cutting off the discharge current of the main capacitor 4 to the flash discharge tube, however, the light flash may be stopped by bypassing the discharge current of the main capacitor 4.

According to the present invention, with an electronic photoflash unit that can be used both as a remote control device transmitter and as a photoflash for general flash photography; it is possible to decrease the amount of light used for the transmitter, and to increase it for the photoflash. Moreover, the changeover of the light amount is carried out interlocking with the changeover of the functions to prevent malfunctioning of the amount of light emitted.

We claim:

1. An electronic photoflash unit having functions as a remote control light transmitter and as a photoflash for flash photography, comprising:

a flash discharge tube;

a main capacitor for providing a discharge current to energize said flash discharge tube;

a trigger circuit connected to trigger the energization of said flash discharge tube causing discharge by said main capacitor;

a switching circuit connected to deenergize the radiation from the flash discharge tube;

a delay circuit selectively connected for actuating said switching circuit after a regulated time interval measured from the initiation of radiation from said flash discharge tube;

interlocking switch means provided in one of said switching circuit and said delay circuit, and having contacts for permitting the operation of said switching circuit by the output of said delay circuit when said photoflash unit is dismounted from said camera and for preventing the operation of said switching circuit by the output of said delay circuit when said photoflash unit is mounted on said camera; and an accessory shoe having a slidable insulator member which is spring loaded outwardly thereof, wherein the accessory shoe is receivable in an accessory clip on a camera, and wherein said contacts of said interlocking switch means are separated from said slidable member and disposed in a closed position when the accessory shoe is disconnected from the accessory clip, and, when the accessory shoe is fixed in the accessory clip, said slidable member is displaced so as to engage with said interlocking switch means to hold said contacts in an open position.

* * * * *